(12) United States Patent
Zhao et al.

(10) Patent No.: US 10,477,030 B2
(45) Date of Patent: Nov. 12, 2019

(54) LTE CELLULAR MOBILE NETWORK ACCESS SYSTEM AND CORRESPONDING COMMUNICATION METHOD

(71) Applicant: Beijing Travelrely Software Technologies Co., Ltd., Beijing (CN)

(72) Inventors: Kai Zhao, Beijing (CN); Hu Wang, Beijing (CN); Qijun Wang, Beijing (CN)

(73) Assignee: Beijing Travelrely Software Technologies Co., Ltd., Beijing (CN)

( * ) Notice: Subject to any disclaimer, the term of this patent is extended or adjusted under 35 U.S.C. 154(b) by 0 days.

(21) Appl. No.: 15/560,730

(22) PCT Filed: Jan. 15, 2016

(86) PCT No.: PCT/CN2016/071052
§ 371 (c)(1),
(2) Date: Sep. 22, 2017

(87) PCT Pub. No.: WO2016/161831
PCT Pub. Date: Oct. 13, 2016

(65) Prior Publication Data
US 2018/0054527 A1 Feb. 22, 2018

(30) Foreign Application Priority Data
Apr. 7, 2015 (CN) .......................... 2015 1 0160062

(51) Int. Cl.
*H04W 76/10* (2018.01)
*H04M 7/00* (2006.01)
(Continued)

(52) U.S. Cl.
CPC .......... *H04M 7/0066* (2013.01); *H04L 12/66* (2013.01); *H04M 7/0075* (2013.01);
(Continued)

(58) Field of Classification Search
CPC .. H04M 7/0066; H04M 7/0075; H04M 15/56; H04M 7/1205; H04M 2203/2016; H04M 2215/32; H04M 15/8038; H04M 15/7556; H04W 76/10; H04W 12/06; H04W 8/02; H04W 60/00; H04W 8/04; H04L 12/66
See application file for complete search history.

(56) References Cited

U.S. PATENT DOCUMENTS

2003/0118045 A1 6/2003 Chen
2008/0132279 A1 6/2008 Blumenthal
(Continued)

FOREIGN PATENT DOCUMENTS

CN 103369161 A 10/2013
CN 104023328 A * 9/2014
(Continued)

OTHER PUBLICATIONS

"Digital Cellular Telecommunications System (Phase 2+) . . . " European Telecommunications Standards Institute, Jul. 1, 2014.
EP Search Report dated Oct. 22, 2018 in EP App. No. 16 77 6007.

*Primary Examiner* — Kibrom T Hailu
(74) *Attorney, Agent, or Firm* — Boyle Fredrickson S.C.

(57) ABSTRACT

An LTE cellular mobile network access system and a corresponding communication method are provided. The system includes a SIM card interface device, a mobile terminal, and a NRS accessing to a domestic cellular mobile network. The SIM card interface device is configured to hold a SIM card and forward authentication information of the SIM card to the NRS via the mobile terminal. The mobile terminal is in communication with the NRS via the Internet and is configured to register on the NRS and transmit signaling data and voice data to the NRS. The NRS is configured to establish a standard S1 connection with the domestic cellular mobile network and transmit the signaling data and the voice data to the domestic cellular mobile network.

13 Claims, 3 Drawing Sheets

(51) Int. Cl.
*H04W 12/06* (2009.01)
*H04L 12/66* (2006.01)
*H04M 15/00* (2006.01)
*H04M 7/12* (2006.01)

(52) U.S. Cl.
CPC ........... *H04M 15/56* (2013.01); *H04W 12/06* (2013.01); *H04W 76/10* (2018.02); *H04M 7/1205* (2013.01); *H04M 2203/2016* (2013.01); *H04M 2215/32* (2013.01)

(56) References Cited

U.S. PATENT DOCUMENTS

| | | | |
|---|---|---|---|
| 2009/0129371 A1* | 5/2009 | Bishay ................. | H04M 7/123 370/352 |
| 2009/0225736 A1* | 9/2009 | Patarkazishvili ....... | H04W 8/20 370/338 |
| 2011/0223887 A1* | 9/2011 | Rune .................... | H04L 63/101 455/411 |
| 2013/0023255 A1* | 1/2013 | Yang ................... | H04M 1/7253 455/418 |
| 2014/0321278 A1* | 10/2014 | Cafarelli ............. | H04L 47/2441 370/235 |
| 2015/0173000 A1* | 6/2015 | Basilier ................ | H04W 48/18 370/329 |
| 2016/0037340 A1* | 2/2016 | Rayment ............. | H04L 63/0853 370/338 |

FOREIGN PATENT DOCUMENTS

| | | |
|---|---|---|
| CN | 104023328 A | 9/2014 |
| CN | 104768155 A | 7/2015 |
| EP | 2804408 A1 | 11/2014 |

* cited by examiner

LTE CELLULAR MOBILE NETWORK ACCESS SYSTEM AND CORRESPONDING COMMUNICATION METHOD

CROSS-REFERENCE TO RELATED APPLICATIONS

This application is the national phase of International Patent Application No. PCT/CN2016/071052, filed on Jan. 15, 2016, which claims the priority to Chinese Patent Application No. 201510160062.3, titled "LTE CELLULAR MOBILE NETWORK ACCESS SYSTEM AND CORRESPONDING COMMUNICATION METHOD", filed with the Chinese State Intellectual Property Office on Apr. 7, 2015, both of which are incorporated herein by reference in their entireties.

TECHNICAL FIELD

The disclosure relates to the technical field of mobile communications, and particularly to an LTE cellular mobile network access system and a corresponding communication method.

BACKGROUND OF THE INVENTION

Currently, if people want to use their cell phones abroad, they generally need to activate a roaming service to enjoy an offshore voice communication service. In this case, an additional roaming fee is charged when the cell phone is used abroad.

In fact, the offshore communication service can be implemented by the VoIP technology, in which an analog signal (voice) is digitalized and transmitted over an IP network in real time in the form of data packet. However, this VoIP technology has the following problems: 1) when a cell phone user is in abroad and calls back to his/her domestic country using this technology, the telephone number of the calling party will not be displayed accurately on the called party side, thus causing confusion in identifying the calling party identity, thereby producing unnecessary difficulties in the communication between the both parties; 2) it may be possible that a user in abroad cannot be contacted by dialing the commonly-used number directly; and 3) short messages cannot be sent and received through the current VoIP technical solution.

Furthermore, in a case of a weak wireless signal, unstable network coverage or a base station failure, the cell phone cannot access to the network, which affects the normal communication of the user.

SUMMARY OF THE INVENTION

It is an object of the present disclosure to provide an LTE cellular mobile network access system and a corresponding communication method, with which a cell phone can perform offshore wireless communication without incurring extra roaming fees.

In order to achieve the above object, an LTE cellular mobile network access system is provided according to the present disclosure, which includes: a SIM card interface device, a mobile terminal and a NRS accessing to a domestic cellular mobile network, where the SIM card interface device is configured to hold a SIM card and forward authentication information of the SIM card to the NRS via the mobile terminal; the mobile terminal is in communication with the NRS via the Internet and is configured to register on the NRS and transmit signaling data and voice data to the NRS; and the NRS is configured to establish a standard S1 connection with the domestic cellular mobile network and transmit the signaling data and the voice data to the domestic cellular mobile network.

The SIM card interface device may include a Bluetooth device, a film-mounted SIM card, a card reader or a device with an IP network function.

The SIM card interface device may be replaced by a SIM card hosting device.

The mobile terminal may include: a cell phone, a tablet computer, a desktop computer, or a laptop computer, or a corresponding App.

The NRS is connected with a database.

An LTE cellular mobile network access system communication method for the above LTE cellular mobile network access system is provided according to the present disclosure, which includes:

step 1) accessing, by the mobile terminal, to the domestic cellular mobile network via the NRS, wherein the mobile terminal communicates with the SIM card via the SIM card interface device, and the SIM card assists the mobile terminal to perform an authentication process for accessing to the domestic cellular mobile network;

step 2) reading, by the mobile terminal, SIM card information to perform registration onto the NRS, and establishing, by the mobile terminal, an IP data channel between the NRS and the mobile terminal for transmitting the signaling data and the voice data;

step 3) accepting, by the NRS, the registration, establishing, by the NRS, the standard S1 connection between the SIM card and the domestic cellular mobile network, and transmitting, by the NRS, registration signaling to the domestic cellular mobile network to register the SIM card on a core network of an operator;

step 4) storing, by the NRS, information of the mobile terminal and the SIM card information, and simulating, by the NRS, a state and signaling of the mobile terminal to control transmission of a short message;

step 5) performing, by the NRS, an authentication process with the domestic cellular mobile network based on the authentication information of the SIM card forwarded by the SIM card interface device, wherein on reception of an authentication request from the domestic cellular mobile network, the NRS performs the authentication process by accessing the SIM card via the mobile terminal, a result of the authentication is fed back to the NRS, and the NRS transmits the result of the authentication to the domestic cellular mobile network;

step 6) accessing, by the mobile terminal, to the domestic cellular mobile network via the NRS, to communicate with a peer communication device by means of a call or a short message.

In the step 6), a process of the mobile terminal initiating a call may include:

sending, by the mobile terminal, a call request to the NRS;

establishing, by the NRS, a connection to the domestic cellular mobile network via the standard S1 interface for performing a call process; and establishing, by the mobile terminal, a connection for a call with the peer communication device in the domestic cellular mobile network via the NRS, to transmit a voice stream.

In the step 6), a process of the mobile terminal receiving a call may include:

establishing, by the peer communication device, a connection to the NRS via the domestic cellular mobile network using the standard S1 interface, to page a user of the SIM card; and receiving, by the NRS, the calling request, paging the mobile terminal through the Internet and establishing a connection for a voice call.

In the step 6), a process of the mobile terminal sending a short message may include:

sending, by the mobile terminal, the short message to the NRS; and sending, by the NRS sever, the short message to the peer communication device via the domestic cellular mobile network.

In the step 6), a process of the mobile terminal receiving a short message may include:

converting, by the NRS, the short message to an IP message on reception of the short message transmitted via the domestic cellular mobile network; and sending the IP message to the mobile terminal.

As compared with the conventional technology, the present disclosure has the following benefits:

1) in a case where the user performs communication abroad using a home SIM card, the user can also enjoy the domestic communication service and tariff via communicating abroad via an App or IM software.

2) the user in abroad can keep both a home SIM card and a local SIM card at standby states, and can perform communication using any one of the two SIM cards at his/her own selection.

DETAILED DESCRIPTION OF THE EMBODIMENTS

Figure 1:
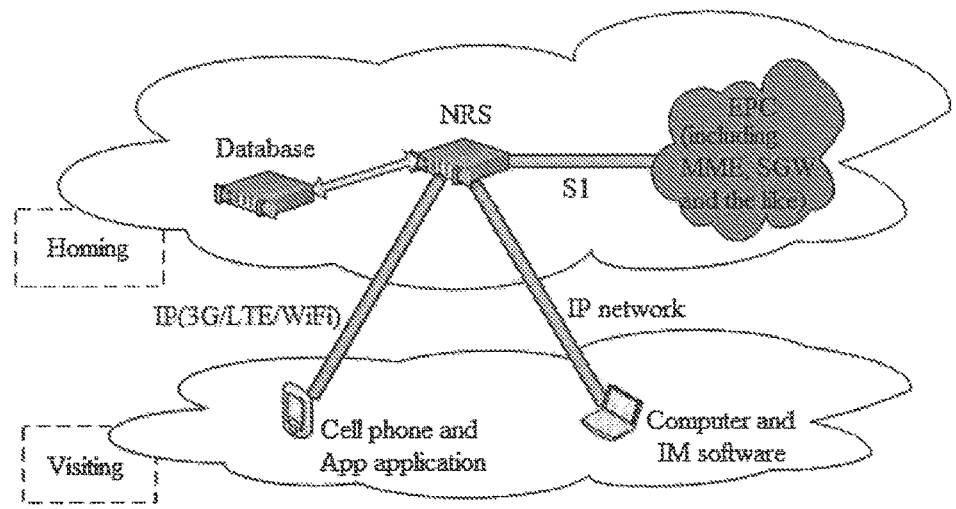
FIG. 1 is a schematic structural diagram of an LTE cellular mobile network access system according to an embodiment of the present disclosure.

Embodiments of the present disclosure are described with reference to the drawings in the following. Elements and features described in one of the drawings or one embodiment of the present disclosure may be combined with elements and features as shown in one or more other drawings or embodiments. It should be noted that, for the purpose of clarity, indication and description of components and processing irrelevant to the present disclosure and known by those skilled in the art are omitted in the drawings and the description.

The technical solution is further described hereinafter in conjunction with the drawings.

FIG. 1 illustrates an LTE cellular mobile network access system according to an embodiment, which includes: a SIM card interface device (not shown in FIG. 1), a mobile terminal (shown as a cell phone and an App application of the cell phone, or a computer and an IM software of the computer in FIG. 1), and a NRS (No Roaming Server, which is abbreviated as NRS, and may also be referred to as a home server) accessing to a domestic cellular mobile network (EPC-sub-system including a MME, a SGW and related). In FIG. 1, "Homing" represents a home network, and "Visiting" represents a foreign network. The SIM card interface device is used for holding a SIM card and is configured to forward authentication information of the SIM card to the NRS via the mobile terminal. The mobile terminal communicates with the NRS via the Internet and is configured to register on the NRS and transmit signaling data and voice data to the NRS. The NRS establishes a standard S1 connection with the domestic cellular mobile network and transmits the signaling data and the voice data to the domestic cellular mobile network.

As a preferred embodiment, the NRS may be connected with a database (as shown in FIG. 1).

Figure 2:
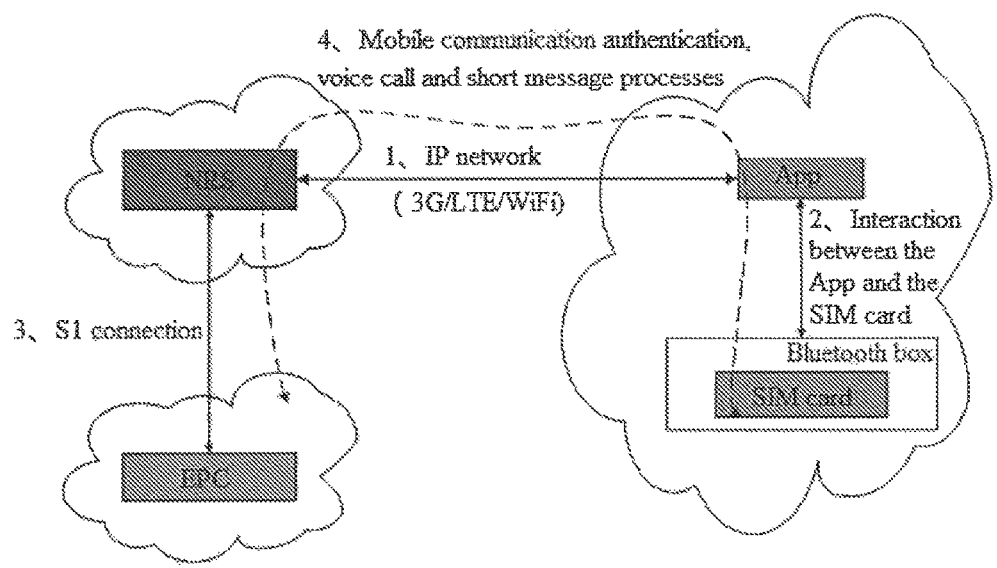
FIG. 2 is a schematic flow diagram showing a communication method for an LTE cellular mobile network access system according to an embodiment of the present disclosure.
Figure 3:
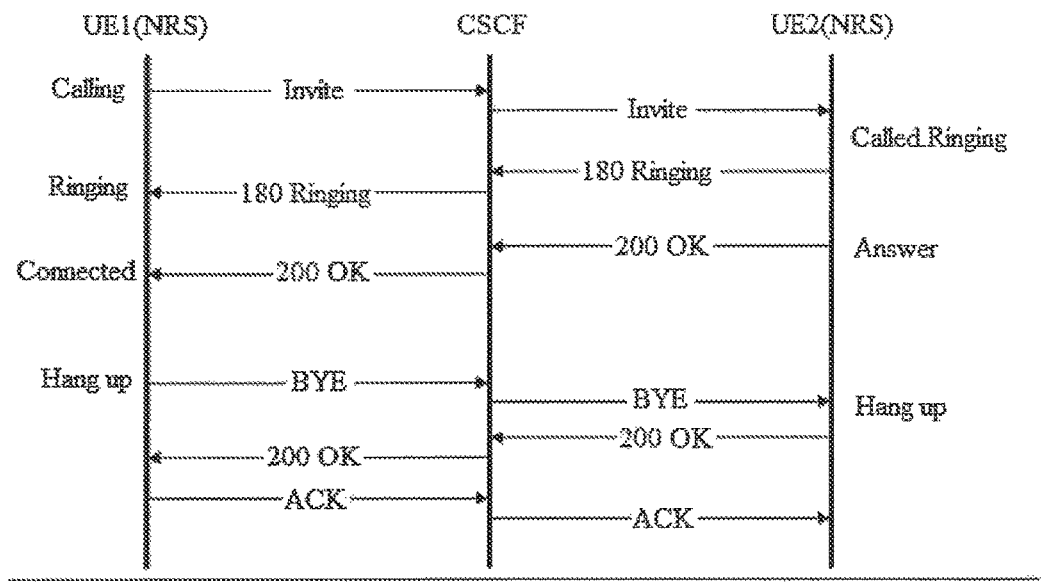
FIG. 3 is a schematic diagram showing a flow of a NRS in an LTE cellular mobile network access system performing a voice call service according to an embodiment of the present disclosure.
Figure 4:
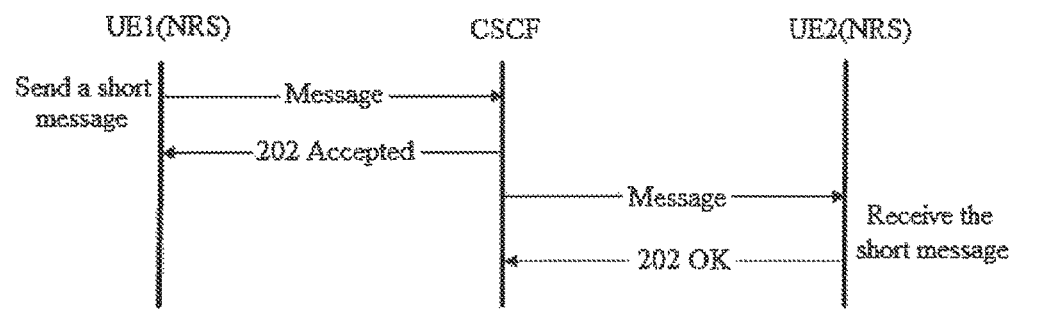
FIG. 4 is a schematic diagram showing a flow of a NRS in an LTE cellular mobile network access system performing a short message service according to an embodiment of the present disclosure.
Figure 5:
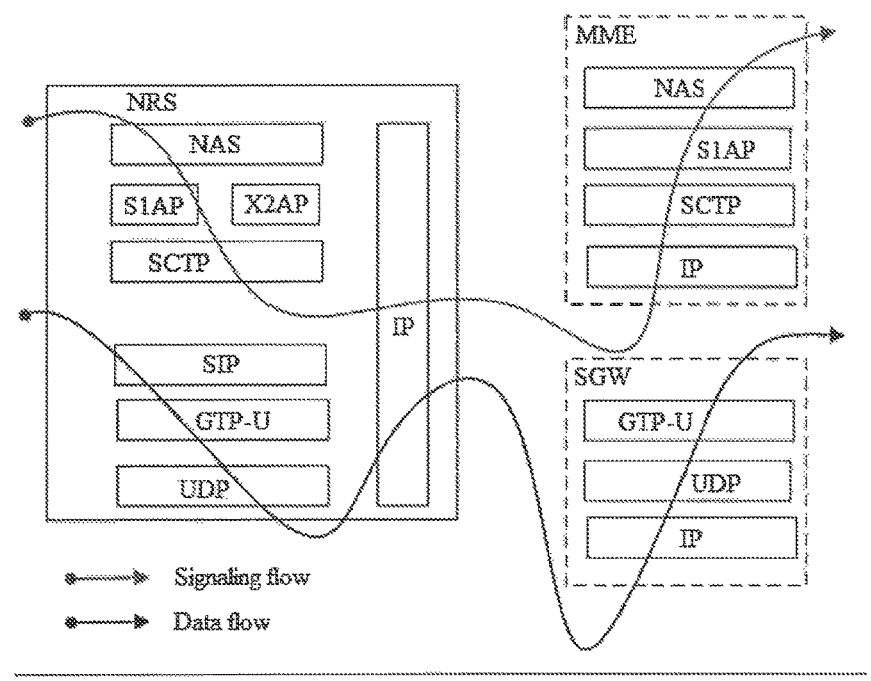
FIG. 5 is a schematic diagram showing an S1 interface protocol stack architecture of an LTE cellular mobile network access system according to an embodiment of the present disclosure.

As a preferred embodiment, the SIM card interface device may be a Bluetooth device (as shown in FIG. 2). The SIM card is installed in the Bluetooth device, and an APP application on the cell phone communicates with the SIM card via the Bluetooth device. Furthermore, the SIM card interface device may also be a film-mounted SIM card, a card reader or a device with an IP network function.

As a preferred embodiment, the SIM card interface device may be replaced by a SIM card hosting device.

The mobile terminal described in the present disclosure includes: a cell phone, a tablet computer, a desktop computer, a laptop computer, or a corresponding App.

An LTE cellular mobile network access system communication method is provided based on the LTE cellular mobile network access system according to the present disclosure. The communication method includes the following steps 1) to 6).

In step 1), the mobile terminal accesses to the domestic cellular mobile network via the NRS. The mobile terminal communicates with the SIM card via the SIM card interface device. The SIM card assists the mobile terminal to perform an authentication process for accessing to the domestic cellular mobile network.

In step 2), the mobile terminal reads SIM card information to perform registration onto the NRS, and establishes an IP data channel between the NRS and the mobile terminal for transmitting the signaling data and the voice data.

The App Logs onto the NRS

When the App requests for logging in the NRS, the server checks whether the App of the user is allowed to access. If the App is allowed to access, an IP channel is established between the App and the NRS, for transmitting the signaling data and the voice data.

The App Communicates with the SIM Card

The SIM card is placed inside the Bluetooth device, and the APP running on the cell phone is connected and communicates with the Bluetooth device using the Bluetooth technology. The Bluetooth device accesses the SIM using a standard 7816 instruction.

The App is registered on a PLMN. The App reads IMSI information from the SIM card via the Bluetooth device, and sends a PLMN (Public Land Mobile Network) registration request to the NRS. The NRS replicates the information as a mobile communication standard S1 interface signaling message, and sends the registration request back to the EPC (the PLMN). During the registration, the EPC network requests the App to perform authentication. The App performs authentication by accessing the SIM card, and feeds an authentication result back to the NRS, which feeds the authentication result back to the EPC. If the authentication is successful, the App is allowed to access to the PLMN.

In step 3), the NRS accepts the registration, establishes the standard S1 connection with the domestic cellular mobile network for the SIM card and transmits registration signaling to the domestic cellular mobile network, to complete the registration of the SIM card on a core network of this mobile network operator.

The NRS includes a standard S1 interface protocol stack, as well as a NAS module and a SIP module, and performs signaling interaction using standard mobile communication interface messages. A speech format of the NRS is the AMR format, which is identical to that in the existing mobile communication network.

An interface between the NRS and the EPC (including an MME and a SGW) is referred to as an S1 interface. Signaling interaction on the S1 interface during a standard PLMN registration includes:

NRS-->MME: Initial UE Message (attach request)

MME-->NRS: authentication request (authentication request)

1) NRS-->App: authentication request message forward

2) App-->NRS: the App sends the authentication request message to the SIM card, the SIM card performs reverse authentication, and calculates a "xres" key, which is returned to the app and transmitted by the app to the NRS NRS-->MME: authentication response (authentication response)

MME->NRS: security mode command (encryption negotiation)

NRS-->MME: security mode complete (encryption confirmation)

MME-->NRS: initial Context Setup Request (attach accept)

NRS-->MME: UE Capability info Indication (UE capability)

NRS-->MME: initial Context Setup Response (attach complete)

where "-->" represents a signaling flow direction.

In step 4), the NRS stores information of the mobile terminal and the SIM card, and simulates a status and signaling of the mobile terminal to control transmission behavior of a short message.

Taking a common cell phone as an example, any registration process, call process and short messaging process flow performed via the S1 interface compiles with the standard signaling and voice interaction. The NRS supports these signaling messages to perform the standard signaling and voice interactions with the EPC. For example, during voice processing, once the NRS module receives AMR voice data from the App, it transmits the AMR voice data to the SGW; Vice versa, the NRS module receives the voice data from the SGW, and transmits the voice data to the App to playback.

In step 5), the NRS performs an authentication process with the domestic cellular mobile network based on the authentication information from the SIM card forwarded by the SIM card interface device. On reception of an authentication request from the domestic cellular mobile network, the NRS performs the authentication process by accessing the SIM card via the mobile terminal, and returns an authentication result to the NRS, and the NRS transmits this authentication result to the domestic cellular mobile network.

In step 6), the mobile terminal accesses to the domestic cellular mobile network via the NRS, to communicate with a peer communication device by means of a call or a short message.

The call process and the short message process to the cellular mobile network in an OTT manner are described as follows.

The process of the App originated voice call is as follows.

The App sends a call setup request to the NRS. The NRS establish a connection to the domestic cellular mobile network via the standard S1 interface and start up a call origination process, the App establishes a connection for a call with the peer communication device in the domestic cellular mobile network via the NRS, for transmitting a voice stream.

The process of the App terminated voice call is as follows.

The peer communication device establishes a connection to the NRS via the domestic cellular mobile network using the standard S1 interface to page a user of the SIM card. The NRS receives the calling request, and pages the APP through internet to establish a connection for a voice call.

The process of the APP originated SMS is as follows.

The App sends the short message to the NRS. The NRS server sends the short message to the peer communication device via the domestic cellular mobile network.

The process of the App terminated SMS is as follows.

On reception of the short message transmitted via the domestic cellular mobile network, the NRS converts the short message to an IP message and sends back to the App.

The SIM card is a key module for the cellular mobile network to authenticate the user. The SIM card can be accessed in multiple manners as follows.

a) In a first manner of accessing the SIM card, the SIM card is installed in a Bluetooth device, and the App establishes a connection to the Bluetooth device using the Bluetooth technology to control the SIM card and exchange data with the SIM card.

b) In a second manner of accessing the SIM card, a film-mounted SIM card (without a Bluetooth module) is attached to the SIM card. The film-mounted SIM card can control the SIM card and exchange data with the SIM card. The App operations the film-mounted SIM card, such as writing a phonebook, a short message and the like to the film-mounted SIM card. The film-mounted SIM card receives an agreed instruction and operates the SIM card. In this manner, the App controls the SIM card and exchanges data with the SIM card.

c) In a third manner of accessing the SIM card, a film-mounted SIM card (with a Bluetooth module) is attached to the SIM card. The film-mounted SIM card can control the SIM card and exchange data with the SIM card. The App accesses the film-mounted SIM card using the Bluetooth technology. The film-mounted SIM card receives an agreed instruction and operates the SIM card. In this manner, the App controls the SIM card and exchanges data with the SIM card.

d) In a fourth manner of accessing the SIM card, the SIM card is placed in a card reader having a USB interface or the like. The card reader is inserted into a computer on which IM software (an instant messaging software) is installed. In this way, the IM controls the SIM card and exchanges data with the SIM card via the USB card reader.

e) In a fifth manner of accessing the SIM card, the SIM card is placed in a simpool having an IP network accessing module (a wireless wifi module or a standard network interface). The simpool can access and control the SIM card. The NRS accesses the simpool directly and acquires the authentication data without transmission by the App or the IM. The authentication process is performed through the communication between the NRS and the simpool, and thus the cell phone no longer needs the Bluetooth device or other peripheral products.

The application terminal accessing to the NRS may be implemented in multiple manners as follows.

a) In a first manner, the application terminal may be in the form of an App. For example, specialized App software is installed on a smart phone or a pad, by which to access the NRS.

b) In a second manner, the application terminal may be in the form of IM. For example, specialized IM software is installed on a PC computer, by which to access the NRS.

It should be noted that the solution described in the present disclosure satisfies the following pre-requisites:

1. A specialized App is installed on the cell phone of the user.

1.1. The App is capable of communicating with the SIM card (via the Bluetooth device or the like).

1.2. The App is capable of accessing to an IP communication network through either 3G, LTE, or WiFi channels.

1.3. The App is connected with the NRS and accesses to the domestic cellular mobile network through the OTT technology.

Alternatively, the solution described in the present disclosure satisfies the following pre-requisites:

2. a NR solution function is implanted in the operation system of the cell phone.

2.1. the cell phone is capable of accessing to the IP communication network through either a 3G, LTE, or WiFi channels.

2.2. The cell phone directly accesses the SIM card to be hosted.

2.3. The cell phone is connected with the NRS and accesses to the domestic cellular mobile network through the OTT technology.

Although the technical solution and the advantages thereof are described in detail, it should be understood that various changes, substitutions and alterations can be made without departing from the spirit and scope of the present disclosure as defined by the following claims. Moreover, the scope of the present disclosure is not intended to be limited to the particular embodiments of the process, device, means, methods and steps described in the specification. Those skilled in the art will readily appreciate from the present disclosure that processes, device, means, methods, or steps, presently existing or later to be developed that perform substantially the same function or achieve substantially the same result as the corresponding embodiments described herein may be utilized according to the present disclosure. Therefore, the appended claims are intended to include within their scope such processes, means, methods, or steps.

The invention claimed is:

1. A LTE (Long-Term Evolution) cellular mobile network access system communication method for a LTE cellular mobile network access system comprising a SIM (Subscriber Identity Module) card interface device configured to hold a SIM card, a mobile terminal, and a NRS (No Roaming Server) accessing a domestic cellular mobile network, the LTE cellular mobile network access system communication method comprising:

step 1) accessing, by the mobile terminal, the domestic cellular mobile network via the NRS, wherein the mobile terminal communicates with the SIM card via the SIM card interface device, and the SIM card assists the mobile terminal to perform an authentication process for accessing the domestic cellular mobile network;

step 2) reading, by the mobile terminal, SIM card information to perform registration onto the NRS, and establishing, by the mobile terminal, an IP data channel between the NRS and the mobile terminal for transmitting the signaling data and the voice data;

step 3) accepting, by the NRS, the registration, establishing, by the NRS, the standard S1 connection with the domestic cellular mobile network for the SIM card, and transmitting, by the NRS, registration signaling to the domestic cellular mobile network to register the SIM card on a core network of an operator;

step 4) storing, by the NRS, information of the mobile terminal and the SIM card information, and simulating, by the NRS, a state and signaling of the mobile terminal to control transmission of a short message;

step 5) performing, by the NRS, an authentication process with the domestic cellular mobile network based on the authentication information of the SIM card forwarded by the SIM card interface device, wherein on reception of an authentication request from the domestic cellular mobile network, the NRS performs the authentication process by accessing the SIM card via the mobile terminal, a result of the authentication is fed back to the NRS, and the NRS transmits the result of the authentication to the domestic cellular mobile network; and step 6) accessing, by the mobile terminal, the domestic cellular mobile network via the NRS, to communicate with a peer communication device by means of a call or a short message.

2. The LTE cellular mobile network access system communication method according to claim 1, wherein in the step 6), a process of the mobile terminal initiating a call comprises:

sending, by the mobile terminal, a call request to the NRS;

establishing, by the NRS, a connection to the domestic cellular mobile network via the standard S1 interface for performing a call process; and establishing, by the mobile terminal, a connection for a call with the peer communication device in the domestic cellular mobile network via the NRS, to transmit a voice stream.

3. The LTE cellular mobile network access system communication method according to claim 1, wherein in the step 6), a process of the mobile terminal receiving a call comprises:

establishing, by the peer communication device, a connection to the NRS via the domestic cellular mobile network using the standard S1 interface, to page a user of the SIM card; and receiving, by the NRS, the calling request, paging the mobile terminal through the Internet and establishing a connection for a voice call.

4. The LTE cellular mobile network access system communication method according to claim 1, wherein in the step 6), a process of the mobile terminal sending a short message comprises:

sending, by the mobile terminal, the short message to the NRS; and sending, by the NRS sever, the short message to the peer communication device via the domestic cellular mobile network.

5. The LTE cellular mobile network access system communication method according to claim 1, wherein in the step 6), a process of the mobile terminal receiving a short message comprises:
  converting, by the NRS, the short message to an IP message on reception of the short message transmitted via the domestic cellular mobile network; and
  sending the IP message to the mobile terminal.

6. The LTE cellular mobile network access system communication method according to claim 1, wherein the SIM card interface device comprises a Bluetooth device, a film-mounted SIM card, a card reader or a device with an IP network function.

7. The LTE cellular mobile network access system communication method according to claim 1, wherein the SIM card interface device is a SIM card hosting device.

8. The LTE cellular mobile network access system communication method according to claim 1, wherein the mobile terminal comprises: a cell phone, a tablet computer, a desktop computer, or a laptop computer, or a corresponding App.

9. The LTE cellular mobile network access system communication method according to claim 1, wherein the NRS is connected with a database.

10. The LTE cellular mobile network access system communication method according to claim 1, wherein a process of the mobile terminal initiating a call comprises:
  raising, by the mobile terminal, a voice call request to the NRS;
  performing the step 1) to step 5) by the NRS which is connected to the LTE cellular mobile access network via the standard S1 interface; and
  initiating, by the NRS, a voice connection with the peer communication device in the LTE cellular mobile access network, to transmit a voice stream towards the mobile terminal at the other end.

11. The LTE cellular mobile network access system communication method according to claim 1, wherein a process of the mobile terminal receiving a call comprises:
  receiving, by the NRS, a connection request via the LTE cellular mobile access network through the standard S1 interface when paging coming in from the peer communication device, and pending to reach out a user on the mobile terminal hosing the SIM card; and
  establishing, by the NRS, a voice connection towards the mobile terminal hosting the SIM card, wherein the mobile terminal is connected to the NRS via the Internet.

12. The LTE cellular mobile network access system communication method according to claim 1, wherein a process of the mobile terminal sending a short message (SMS) comprises:
  raising, by the mobile terminal, a SMS request to the NRS through IP messaging;
  performing the step 1) to step 5) by the NRS which is connected to the LTE cellular mobile access network via the standard S1 interface; and
  initiating, by the NRS, a SMS origination with the peer communication device in the LTE cellular mobile access network, to transmit a text stream towards a peer user at the other end.

13. The LTE cellular mobile network access system communication method according to claim 1, wherein, a process of the mobile terminal receiving a short message comprises:
  fetching, by the NRS, an IP messaging connection to the mobile terminal hosting the SIM card when the NRS receives a short message connection request from the LTE cellular mobile access network through the standard S1 interface; and
  listening, by the mobile terminal connected to the NRS via the Internet, to the NRS to establish a connection for receiving the short message.

\* \* \* \* \*